(12) United States Patent
Betournay et al.

(10) Patent No.: US 9,170,431 B2
(45) Date of Patent: Oct. 27, 2015

(54) EYEWEAR AND LENSES WITH DEFLECTION ATTENUATION MECHANISMS

(71) Applicant: Smith Optics, Inc., Ketchum, ID (US)

(72) Inventors: Matthew Betournay, Clinton, UT (US); Nathan Barg Abney, Willard, UT (US); William Currier McNeal, Salt Lake City, UT (US)

(73) Assignee: Smith Optics, Inc., Portland, OR (US)

( * ) Notice: Subject to any disclaimer, the term of this patent is extended or adjusted under 35 U.S.C. 154(b) by 185 days.

(21) Appl. No.: 13/662,303

(22) Filed: Oct. 26, 2012

(65) Prior Publication Data

US 2014/0118682 A1    May 1, 2014

(51) Int. Cl.
| | | |
|---|---|---|
| G02C 1/02 | (2006.01) | |
| G02C 1/04 | (2006.01) | |
| G02C 7/12 | (2006.01) | |
| G02C 1/00 | (2006.01) | |

(52) U.S. Cl.
CPC .. *G02C 1/04* (2013.01); *G02C 1/00* (2013.01); *G02C 7/12* (2013.01)

(58) Field of Classification Search
CPC ........ G02C 7/02; G02C 7/12; G02C 2202/04; G02C 2200/08; G02C 1/023
USPC ............... 351/86, 83, 110, 41, 116, 111, 138, 351/106, 103
See application file for complete search history.

(56) References Cited

U.S. PATENT DOCUMENTS

| | | | |
|---|---|---|---|
| 5,387,949 A | | 2/1995 | Tackles |
| 5,523,805 A | | 6/1996 | Kuipers et al. |
| 5,592,242 A | * | 1/1997 | Ooie ............................... 351/44 |
| 5,757,457 A | * | 5/1998 | Conway ........................ 351/138 |
| 2011/0194065 A1 | | 8/2011 | Belbey et al. |
| 2011/0304813 A1 | | 12/2011 | Xiao |

FOREIGN PATENT DOCUMENTS

| | | |
|---|---|---|
| CA | 1200996 | 2/1986 |
| CA | 2539125 | 4/2005 |

OTHER PUBLICATIONS

First office action dated Mar. 18, 2015 issued for CA Appln No. 2,831,446.

* cited by examiner

*Primary Examiner* — Hung Dang
(74) *Attorney, Agent, or Firm* — Dorsey & Whitney LLP (57) ABSTRACT

Eyewear, lenses, and methods of forming lenses are disclosed. In an example eyewear, first and second temples are coupled to a lens. The lens includes a viewing portion, a mounting portion configured to be coupled to at least one of the first and second temples, a connecting portion connecting the mounting portion to the viewing portion of the lens. The lens further includes an elongated slot that defines at least in part the mounting portion and the connecting portion. The mounting portion and connecting portion are configured to effectively isolate the viewing portion from deflection of the mounting portion.

23 Claims, 8 Drawing Sheets

EYEWEAR AND LENSES WITH DEFLECTION ATTENUATION MECHANISMS

TECHNICAL FIELD

The present disclosure relates to eyewear, and more particularly in one or more of the illustrated embodiments, to eyewear and lenses with deflection attenuation mechanisms that may reduce deflection of a viewing portion of the lenses.

BACKGROUND

Protective eye wear is used to protect the wearer's eyes from projectiles and or other undesirable particulates in the surrounding area, for example, in an industrial setting or in a combat zone. In addition, protective eye wear may be worn during sports such as cycling, skiing, archery, or others. Various configurations of protective eye wear are known in the art, however, many conventional eye shields suffer from deficiencies. One or more problems of the art may be addressed by the present examples

BRIEF DESCRIPTION OF THE DRAWINGS

The foregoing and other features of the present disclosure will become more fully apparent from the following description and appended claims, taken in conjunction with the accompanying drawings. Understanding that these drawings depict only several examples in accordance with the disclosure and are, therefore, not to be considered limiting of its scope, the disclosure will be described with additional specificity and detail through use of the accompanying drawings, in which:

DESCRIPTION

In the following detailed description, reference is made to the accompanying drawings, which form a part hereof. In the drawings, similar symbols typically identify similar components, unless context dictates otherwise. The illustrative examples described in the detailed description, drawings, and claims are not meant to be limiting. Other examples may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are implicitly contemplated herein.

Eye shields are generally known in the art, however conventional eye shields may have shortcomings resulting in poor optical performance. The optical performance of a lens may be determined, in part, by the curvature of the lens. Flexure or other deflections applied to the lens may affect the optical performance of the lens. Eyewear and lenses including deflection attenuation mechanisms may be implemented according to the present examples, and may, in this regard, improve the optical performance of the eyewear.

Wearers of protective eyewear (e.g., eye shields) may have heads of different shapes and sizes. In order to provide a suitable fit and position the lens focal point relative to the wearer's eyes, a custom-sized frame may be fabricated or a frame may be adjusted to fit the particulars of the wearer's face. For example, the distance between a wearer's ear and nose, the width of the head, the shape and/or size of the head may all affect the optical performance of eyewear with respect to a particular user, and for these reasons, custom-fit eyewear is typically desired in certain circumstances, for example, in the case of prescription eye glasses. In the case of other eyewear (e.g., single use, disposable or other non-user specific eyewear), generally acceptable optical performance may be required without customizing the fit to each particular wearer. As will be understood, customization may significantly increase the cost of the eyewear and may therefore be cost-prohibitive. With some eyewear, in order to reduce production costs, a goal may be to minimize the number of components, particularly more complex or more expensive components, such as hinges, or other adjustment mechanisms which may generally provide for a more customizable fit. In this regard, a conventional eye shield may include a simplified frame, generally made from a relatively stiff plastic material, and in many cases, the lens, typically a unitary lens may be permanently attached to the frame of the eye shield, for example, by gluing the lens with an epoxy or other permanent adhesive.

Conventional eyewear, for example, eye glasses or eye shields, may include hinges at the temples to allow the frame to be folded when the eyewear is not in use by the wearer. As will be understood, a hinge is a type of bearing that connects two solid objects, typically allowing only a limited angle of rotation between them, Hinges may be implemented using a flexible material or using moving components. The size and complexity of hinges may vary, and in some examples spring-hinges may be used to bias the temple bars of the frame towards one or more preferred positions, such as a collapsed or folded position and an expanded of unfolded position. In some examples, as in the case of custom fit eyewear, spring-hinges may be further configured to allow a certain level of rotation of the hinge beyond the expanded position. This functionality may be desirable in some oases particularly in the case where the frame and/or lens is made of a relatively rigid material. Furthermore, this functionality of the spring-hinge may prevent undesirable flexure from being imparted to the front portions of frame and/or lens. However and as previously described, the use of such components may not be practical and an alternative solution to the problem of undesirable flexure may be desirable.

Figure 1:
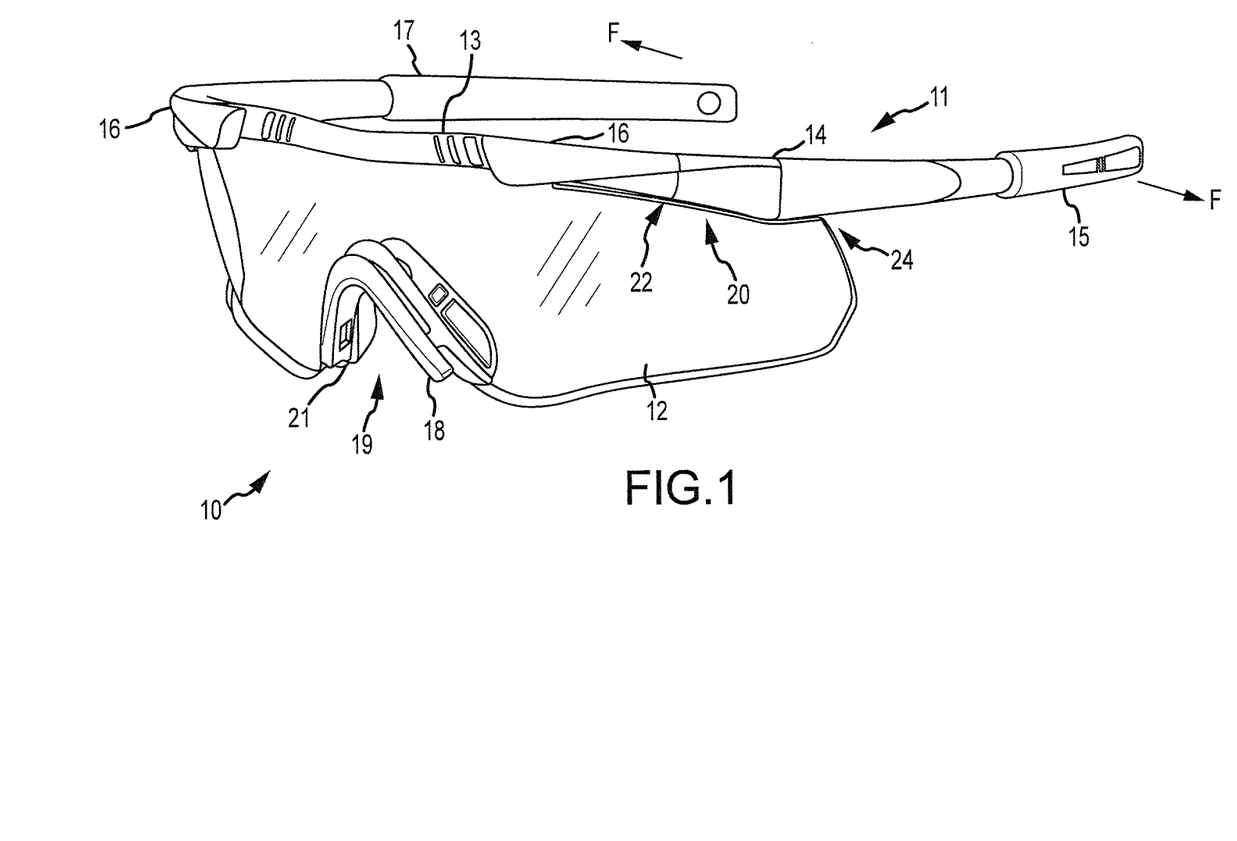
FIG. 1 is an isometric view of eyewear according to one example of the present disclosure.
Figure 2:
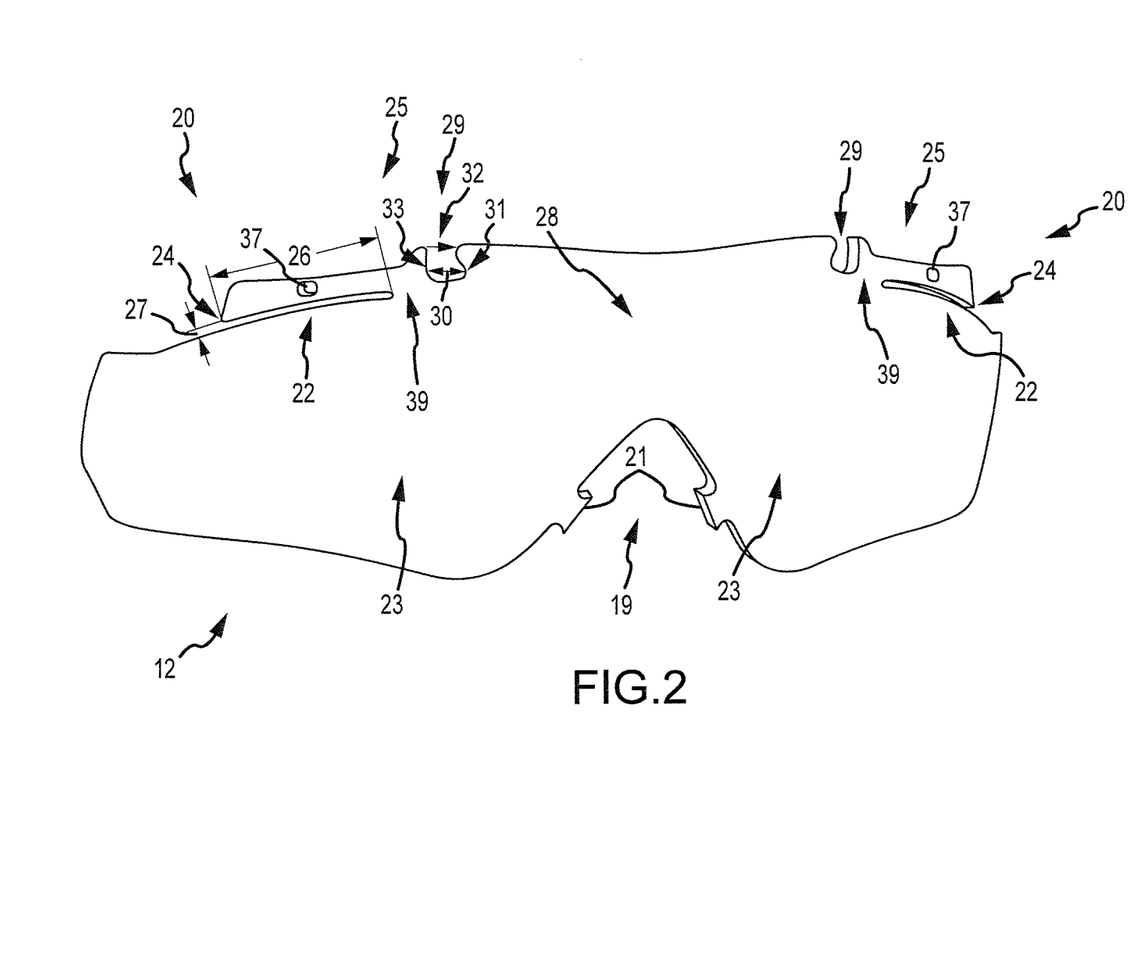
FIG. 2 is an isometric view of a lens, which may be used with the eyewear in the example in FIG. 1.

FIG. 1 shows eyewear according to one example of the present disclosure, and FIG. 2 shows a lens, which may be used with the eyewear in the example in FIG. 1. As will be understood and further described, eyewear according to some of the examples described herein may be configured to be used as protective eyewear or eyeshields, and may thereby include impact resistant lenses, although the examples described herein are not limited in this manner or only to such uses. Lenses of impact resistant eyewear (also referred to as high impact lenses) may be harder than lenses used in typical sunglasses, eyeglasses or other eyewear. High impact lenses may be configured to withstand impact from shrapnel or other ballistics without fracturing or shattering of the lens. Such eyewear may be used, for example, for protection from ballistics in a combat zone or in other hazardous conditions.

Referring now to the examples in FIGS. 1 and 2, the eyewear 10 may include a lens 12 and a frame 14. The frame 14 may include a front bar 13 and temples 15, 17. The temples 15, 17 may be hingedly coupled to the front bar 13, and configured to be unfolded to provide the frame 14 from a closed or folded position to an expanded or open position, as shown in FIG. 1. The hinge may include a hard stop, which may constrain the angle of rotation of the hinge from the closed to the open position. More complex hinges are also known in the art, which may include a spring mechanism allowing the temples to be deflected beyond the natural open position. However, the complexity of such hinges may render them costly, and may be unsuitable for use in some eyewear.

In the case where the hinge includes a hard stop, once the frame 14 is expanded to the open position, any additional outward force F applied to the temples 15, 17 may cause the lens 12 to bend outwardly beyond its natural state. Such outward force F may be applied by the wearer, for example, in the case where the wearer's head is larger than can be accommodated within the space 11 defined by the open position of the frame. Examples according to the present disclosure may reduce or prevent such undesirable deflections (e.g., bending) of the lens 12, whether or not the lens is flat or curved in its natural state.

Figure 3A:
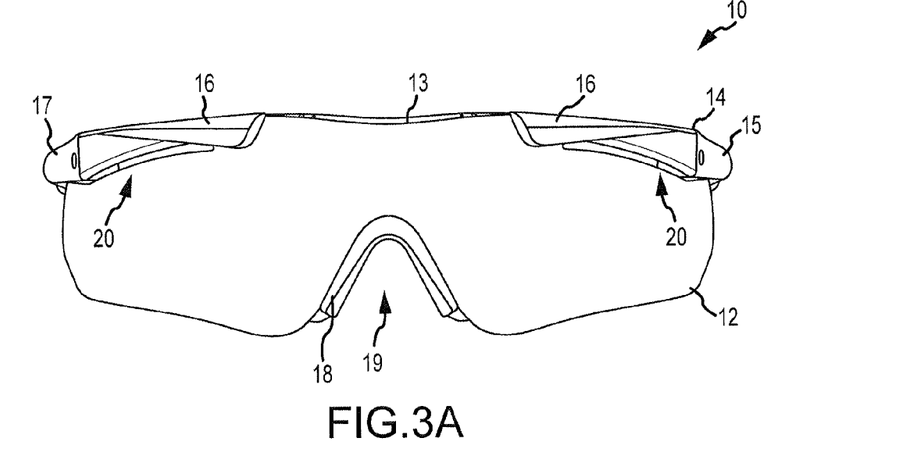
FIGS. 3A-3D are front, side, top, and bottom views of the eyewear according to the example in FIG. 1.
Figure 3B:
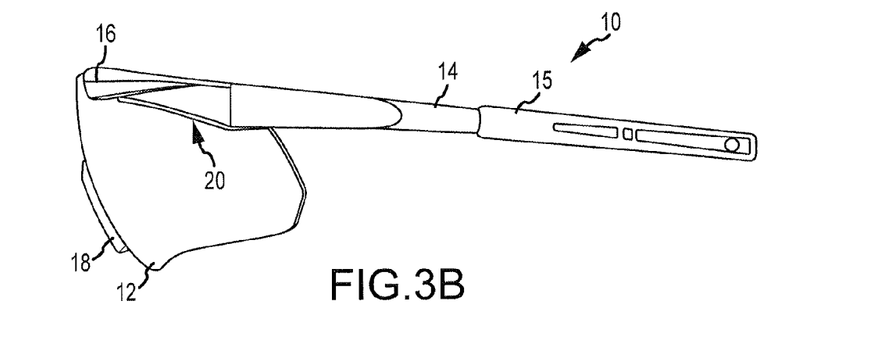
Figure 3C:
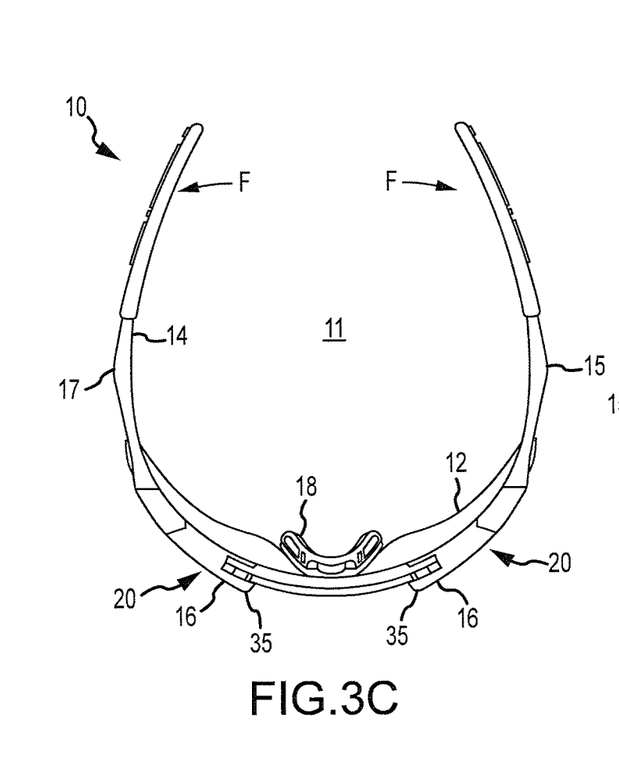
Figure 3D:
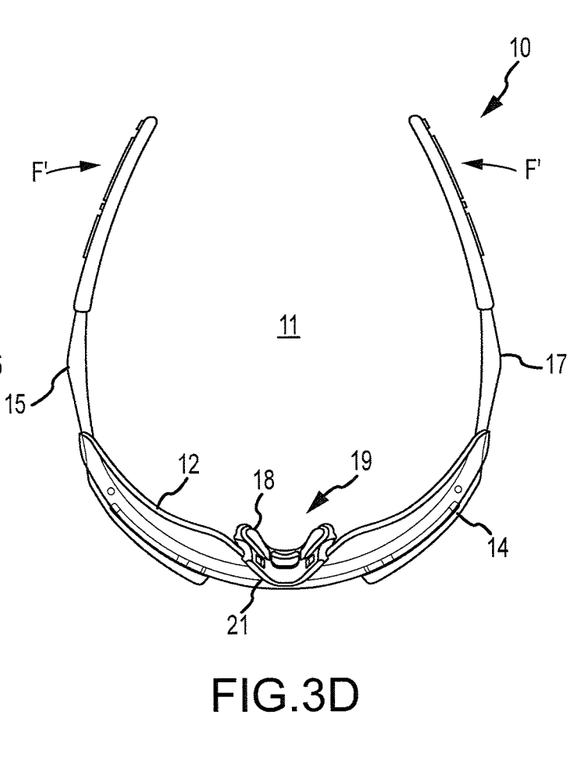

The lens 12 depicted in FIGS. 1 and 2 may include a deflection attenuation mechanism 20, which may be implemented as a recess 22, interchangeably referred to herein as elongated slot. The recess 22 may be an open-ended slot with an opening 24 and extending a length 26 towards an interior portion 28 of the lens. The deflection attenuation mechanism 20 may effectively isolate certain portions of the lens (e.g., the viewing portion 23) from loads or deflections applied at other portions of the lens (e.g., at a mounting portion 25). For example, the width 27 of the opening 24 and length 26 of recess 22 may have a high aspect ratio. The mounting portion 25 may be at least in part defined by the recess 22. A connecting portion 39 coupling the mounting portion 25 to the viewing portion 23 may also be at least in part defined by the recess 22. A force may be applied to the mounting portion 25 of the lens 12 by virtue of the coupling between the frame 14 and lens 12, for example. As described, when an outward force F is applied to one or both of the temples 15, 17 of the frame the lens 12 may be bent outwardly (e.g., against the curvature of the lens), which may be undesirable. The deflection attenuation mechanism 20 may allow the mounting portion 25 to deflect with the deflection of the temples 15, 17, but without deflecting the viewing portion 23. For example, the recess 22 and connecting portion 39 may allow the mounting portion 25 to be biased by the outward force without transferring the deflection forces to the viewing portion 23. As a result, the viewing portion 23 may not deflect, or the degree of deflection is reduced in comparison to a lens not having the deflection attenuation mechanism. The connecting portion 39 may provide a biasing force opposite to that of the deflection forces to return the mounting portion 25 to its natural position when the deflection forces are removed. Notably, in some examples, an inward or compressive force F' (as shown in FIG. 3D) may instead be applied, which may also result in undesirable flexure of the lens 12.

The force and resulting deflection may, in conventional lenses and depending on the material properties of the lens, be transmitted through the lens from the affected area (e.g., where the load is applied) to other portion of the lens, such as the viewing area. Deflections of the viewing area of a lens may be undesirable because it may affect the optical performance which the lens was carefully designed to achieve (e.g., by providing the lens with certain curvature, transparency of material, surface coatings and the like). Deflecting the viewing area of the lens, for example, outwardly against the concavity of the lens, may not only cause temporary optical distortion, but may result in more permanent damage to the lens material and/or coatings (e.g., due to repeated flexing and releasing of the lens). In this regard, the deflection attenuation mechanisms described may reduce or prevent such undesirable deflections of the viewing portion of the lens.

Notably, in certain examples, the affected and isolated areas may be reversed in that loads or deflections may be applied to the viewing portion 23 of the lens (e.g., when the lens is impacted by debris), and the isolated portion may in this case be the mounting portion 25 on the opposite side of the attenuation mechanism from the affected portion. In such instances, for example, when the lens 12 is impacted or otherwise deflected, the disturbance may propagate through the lens 12 causing it to transfer to the wearer and/or causing other undesirable consequences. The deflection attenuation mechanisms described may reduce vibrations of certain portions of the lens from affecting other portions of the lens.

In some examples, the lens 12 may be fixedly mounted to the frame. In other examples, the lens 12 may be removably mounted, for example, by sliding and snapping the lens 12 into engagement with the frame 14. In some examples, fastening mechanisms such as the rotatable fastener 16, shown in closed or engaged configuration in FIG. 1, may be used instead of or in conjunction with slide and/or snap mechanisms of conventional eyewear. The rotatable fastener 16 is shown in a rotated position in FIG. 4 and further described below with reference to FIG. 4. The rotatable fastener 16 may be configured to engage or interlock with a portion of the lens 12 so as to prevent the lens from being removed when the rotatable fastener 16 is in a closed or engaged configuration. When not in use or when the user desires, the rotatable fastener 16 may be manipulated to disengage the lens 12 and allow the lens to be removed and/or replaced. Other conventional techniques for removably mounting the lens 12 to the frame 14 may also be used, for example, by securing the lens against the frame with another removable device, such as a pin or clip, as may be known in the art.

As previously described, the frame 14 may include temples 15, 17, which may couple to a front bar 13. The frame 14 in the example of FIG. 1 is made primarily of plastic, however other materials, for example, metallic materials may be used instead of or in combination with suitable plastics known in the art. The eyewear 10 may also include a nose piece 18, which may be permanently (e.g., using an adhesive or other fastening device) or removably attached to a nose recess 19 of the lens (e.g., using an interfering or snap fit with the protrusions 21). The nose piece 18 may include portions of a softer material for providing a comfortable fit over the nose of the wearer, and may, in some examples, include adjustable portions for providing a more conforming fit regardless of the size and shape of the nose of the wearer.

Referring to FIG. 2, lenses with deflection attenuation mechanisms according to the present disclosure may include a viewing portion 23, a mounting portion 25 and a connecting portion 39 coupling the viewing portion to the connecting portion. The deflection attenuation mechanism 20, which may be implemented as an elongated slot or recess 22, may have a relatively high aspect ratio. In this regard, the recess 22 may operate to substantially decrease the width of the connecting portion 39. Reducing the width of the connecting portion (e.g., relative to the mounting portion) may reduce the area of material through which the deflections may be transmitted to the viewing portion. The introduction of a recess 22 may essentially change the boundary conditions at the loaded portion (e.g., mounting portion 25) of the frame, thus disrupting or modifying the load path through the lens material, which may have otherwise resulted in a conventional lens. The presence of recess 22 may result in a lower bending stiffness at the loaded portion, which may also contribute to the differences in loading experienced by the lens.

The aspect ratio of the length 26 to the width 27 of recess 22 may, in some examples, be greater than 10:1. In other examples, an aspect ratio of 4:1 or greater, 5:1 or greater may be used. In some examples, the length 26 may be at least 7 times the width 27 or more. Any aspect ratio for the recess 22 suitable to effectively isolate the mounting portion 25 from the viewing portion 23 reduce deflection of the viewing area 23 may be used, and the particular aspect ratio may depend on certain factors. Example factors may include the stiffness of the lens, the type of frame and particular coupling configuration between lens and frame (e.g., on top or at sides of lens), the size of the attachment footprint (e.g., surface area of the lens which is in contact with portions of the frame), and the like. In some examples, the deflection attenuation mechanism 20 may be implemented as a plurality of recesses, examples of which will be further described with reference to FIGS. 5 and 6.

Figure 4:
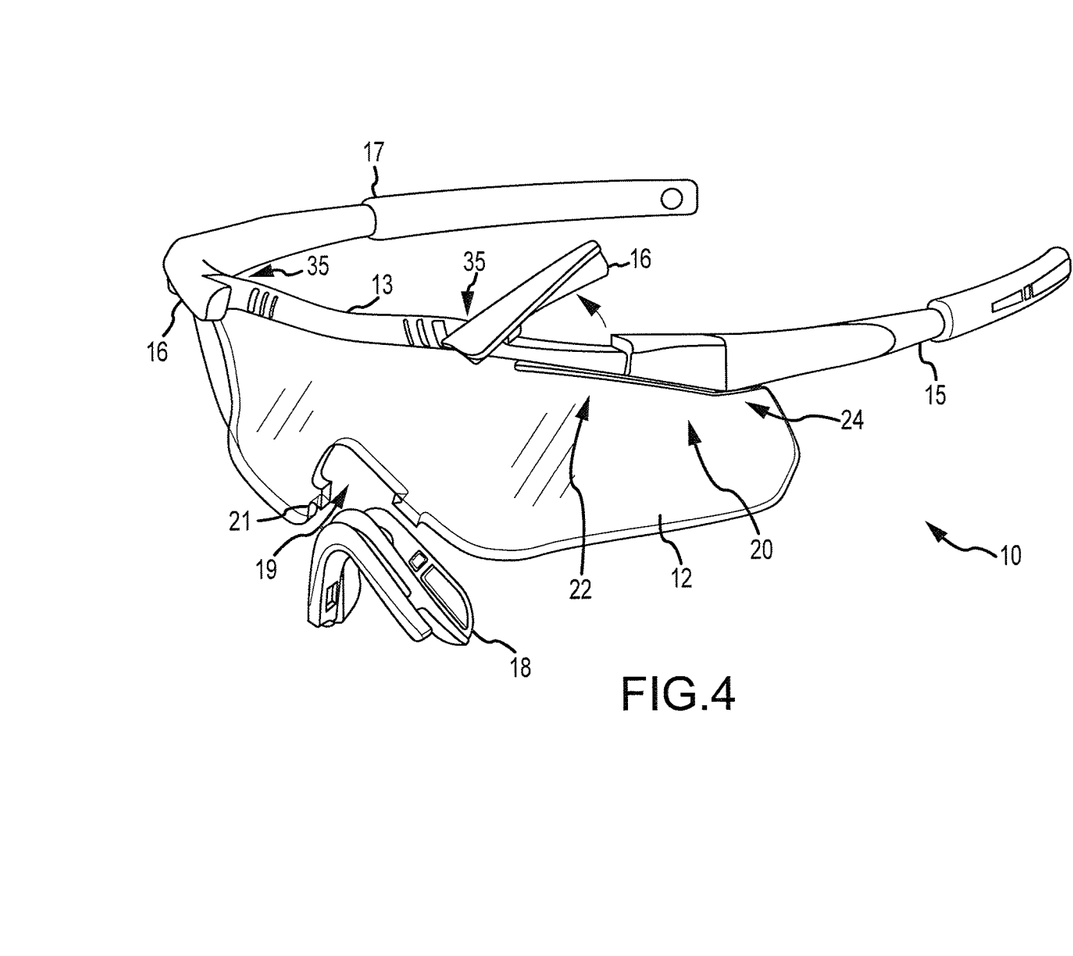
FIG. 4 is an isometric view of an eyewear according to the present disclosure depicting a rotatable fastening mechanism and a removable nose piece.

FIGS. 3A-3D show front, side, top and bottom views, respectively of the example eyewear 10 depicted in FIG. 1. FIG. 4 shows an isometric view of the example eyewear 10 depicted in FIG. 1. Same features have been numbered using the same numerals.

The rotatable fastener 16 is shown in an intermediate rotated position. The rotatable fastener 16 may be in a closed or engaged position as shown in FIG. 1 during use, and may be rotated in the direction indicated by the arrow to release and/or allow the user to remove the lens 12. The rotatable fastener may be configured to be rotated to 90 degrees or more in some examples. In other examples, the rotatable fastener 16 may be configured to fully disengage the lens (e.g., allow the lens to be removed) when rotated to a degree of less than 90 degrees, for example, when rotated to about 30 degrees or more. The rotatable fastener 16 may include a transverse member 35 which may be cooperatively shaped to engage with a mounting portion of the lens.

The mounting portion 25 of the lens may include one or more features to facilitate mounting the lens to the frame. For example, the lens may include a recess 29 (see FIG. 2) for engaging with the rotatable fastener 16. The recess 29 may be generally symmetric (e.g., having a substantially constant diameter) or generally asymmetric, as shown in FIG. 2. The opening 32 of the recess 29 may be narrower than the diameter 30 of the recess, the lens being configured to snap into engagement with the frame. In other examples, and as shown in FIG. 2, the recess may be shaped generally as an oval, with one side 33 of the recess extending farther away from the centerline of the recess than the opposite side 31. As such the recess 29 may be advantageously shaped to guide a transverse member 35 of the fastener 16 into engagement with the eccentric side 33 of the recess. The transverse member 35 may be correspondingly asymmetrically shaped (e.g., be generally cam shaped) so as to work in cooperation with the recess 29 to engage and disengage the lens 12.

Other features may be used in addition or in place of the recess 29. For example, one or more slots (e.g., slot 37) may be formed along the mounting portion 25 of the lens. Corresponding surface features, for example, nubs or other protrusions (not shown) may be formed on a mating surface of the frame to engage with the one or more slots 37. Any other conventional techniques for coupling the frame 14 and lens 12 may also be used. As will be understood, the lens 12 may instead be fixedly attached to the frame, the lens being equipped with a deflection attenuation mechanism 20 according to the present examples, regardless of whether or not the lens is removable.

Figure 5:
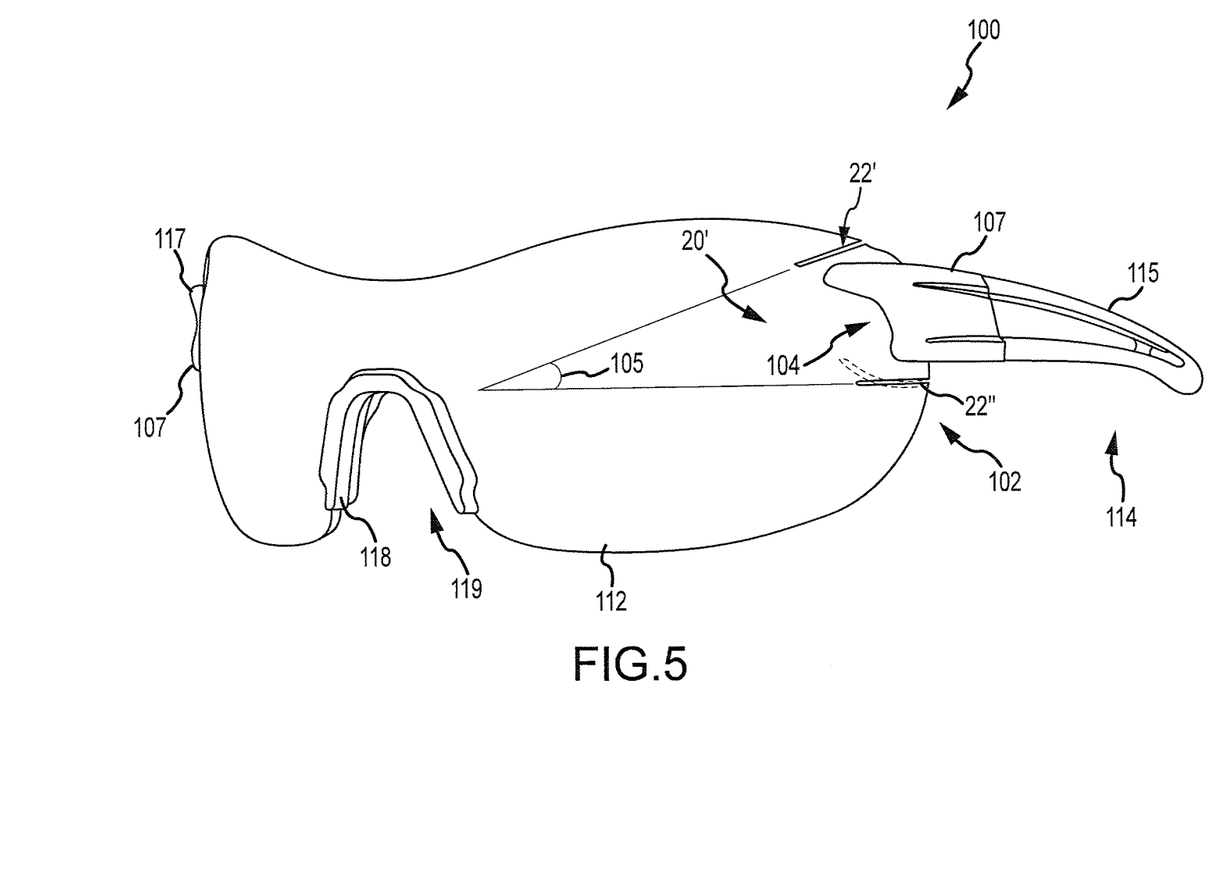
FIG. 5 is an isometric view of eyewear according to another example of the present disclosure.

FIG. 5 shows another example according to the present disclosure. Eyewear 100 includes lens 112 and frame 114. The frame 114 of eyewear 100 includes temples 115, 117 and nose piece 118, which may be fixedly or removably coupled to the lens 112. In this example, the temples 115, 117 are attached to the lens at respective mounting portions 104 proximate sides 102 of the lens.

The lens 112 includes a deflection attenuation mechanism 20' which in this example is implemented as a plurality of slots. The plurality of slots may include a first slot 22' and a second slot 22" both of which may be narrow elongated features extending inward from the perimeter of the lens. The mounting portion 104 is generally defined between the first and second slots 22', 22". In some examples, each of the slots 22', 22" may extend generally towards the viewing portion of the lens.

As described herein, the slots 22', 22" may have a relatively high aspect ratio, for example, as compared to other recesses (e.g., nose recess 119) around the perimeter of lens 112. In some examples, the slots may have an aspect ratio of from about 5:1 to about 10:1, or the aspect ratio may exceed 10:1 in some examples. The slots 22', 22" are formed in the lens 112 adjacent to and at opposite sides of the attachment end 107 of each of the temples 115, 117. For example, slot 22' is located above the attachment end 107 of temple 115 and slot 22" is located below the attachment end 107 of temple 115. The slots 22', 22" may extend in a generally straight line, or they may be curved, as shown in phantom in FIG. 5. The slots 22', 22" may be generally parallel to each other and/or the sides of the attachment end 107 of temple 115, or they may be angled relative to one another or relative to the sides of the attachment end 107. In the example of FIG. 5, the slots 22', 22" are angled with respect to each other defining an angle 105, which in other examples may be smaller or larger than the particular example depicted.

Figure 6:
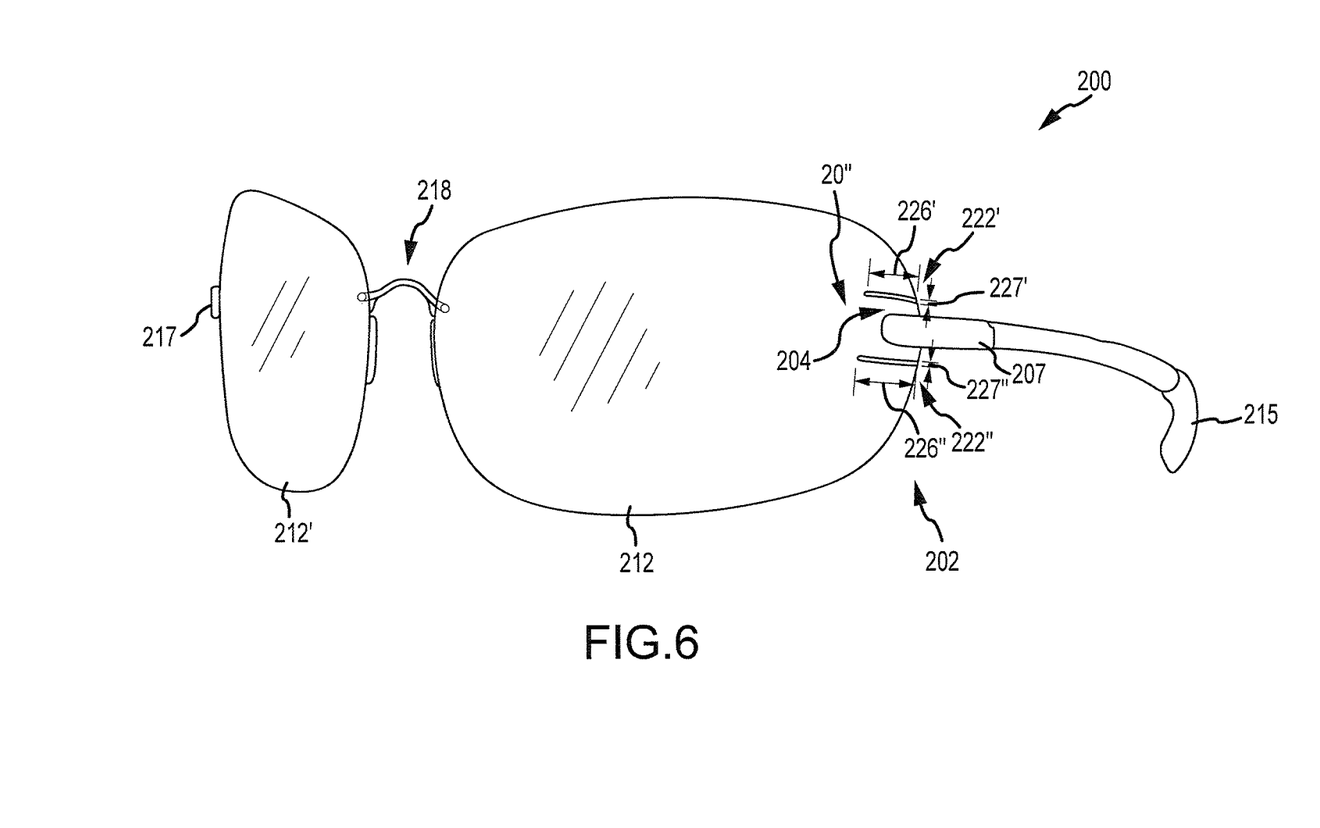
FIG. 6 is an isometric view of eyewear according to yet another example of the present disclosure.

The lens of the example eyewear 100 in FIG. 5 is a unitary lens, however the examples of the present disclosure are not limited in this manner, for example, as shown in FIG. 6. In some examples, the eyewear 200 may include a pair of individual lenses (e.g., lenses 212, 212'), which may be connected using a bridge member 218, as may be known in the art. Furthermore, the temples 215, 217 of the eyewear 200 may be fixedly or removably mounted to respective mounting portions 204 proximate side portions 202 of lenses 212, 212', or other desired location around the perimeter of the lenses. Each of the lenses 212, 212' of the eyewear 200 may include a deflection attenuation mechanism 20" according to any combination of the examples described. The deflection attenuation mechanism 20" may be implemented as a pair of elongated slots 222', 222" in a similar manner to the example of FIG. 5. As described, the slots 222', 222" may be parallel to one another or they may be angled. The mounting portions 204 are generally defined between the slots 222', 222". The lengths 226', 226" and/or widths 227', 227" of slots 222', 222" respectively may be the same or they may be different from one another. Many other characteristics of the slots 222', 222" (e.g., their sizes, shapes and/or locations) may be varied as desired or as needed for the particular application.

Figure 7:
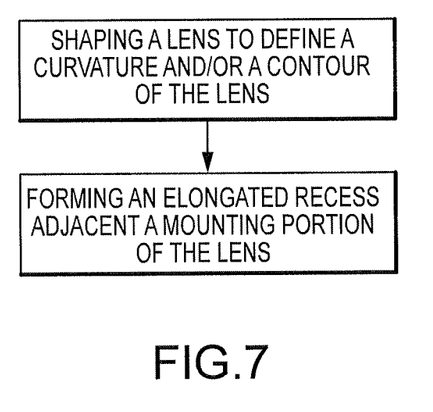
FIG. 7 is a flow diagram of a method of manufacturing eyewear according to examples of the present disclosure.

Referring now to FIG. 7, a method of forming a lens according to the present invention may include shaping the lens to a desired shape, as shown in box 710 and forming an elongated recess in the lens proximate a mounting portion of the lens as shown in box 720. The elongated recess may be configured according to any of the examples herein. According to some examples, the elongated recess may be formed by cutting the recess into the lens after the lens is shaped in the desired contour. The recess may be cut using conventional machining techniques. According to other examples, the recess may be formed while shaping the lens to the desired contour, for example, by using conventional molding techniques. The lens may be formed from any suitable transparent materials known in the art or later developed, for example, polycarbonate or other transparent plastic materials. In some instances the lens may be further processed, for example, for finishing edges of the lens and or treating or coating the lens as may be desired.

Many other advantages of the examples described will be appreciated in light of the present disclosure. While various aspects and examples have been disclosed herein, other aspects and examples will be apparent to those skilled in the art. The various aspects and examples disclosed herein are for purposes of illustration and are not intended to be limiting, with the true scope and spirit being indicated by the following claims.

What is claimed:

1. Eyewear comprising:
a lens including a mounting portion defined at least in part by a recess adjacent to the mounting portion, the lens further including a viewing portion, wherein the mounting portion is at least partially isolated from the viewing portion by the recess, the recess including a width and further including a length which is at least four times greater than the width, wherein the mounting portion is opposite the width of the recess from the viewing portion; and
a frame mounted to the lens by engaging the mounting portion.

2. The eyewear of claim 1, wherein the frame is removably mounted to the lens.

3. The eyewear of claim 2, wherein the frame includes a rotatable fastening mechanism for removably mounting the frame to the lens.

4. The eyewear of claim 1, wherein the frame is mounted to a top portion of the lens.

5. The eyewear of claim 1, wherein the frame includes first and second temples, each temple being mounted to a respective side portion of the lens.

6. The eyewear of claim 5, wherein the lens includes a pair of recesses on opposing sides of attachment ends of the first and second temples.

7. The eyewear of claim 1, wherein the lens includes two lenses, and wherein each of the first and second temples are mounted to respective ones of the lenses.

8. The eyewear of claim 1 further comprising a removable nose piece.

9. The eyewear of claim 1, wherein the lens is polarized or coated.

10. The eyewear of claim 1, wherein the frame is configured to receive an edge of the lens, and wherein the recess is located adjacent the edge and substantially parallel to the edge.

11. The eyewear of claim 1, wherein the recess defines a mounting portion of the lens between the recess and an edge of the lens, and wherein the lens is mounted to the frame at the mounting portion.

12. A lens comprising:
a pane of transparent material; and
an elongated recess formed between a mounting portion and a viewing portion of the lens, the mounting portion being configured for removably mounting the lens to a frame, wherein the elongated recess is configured to isolate the viewing portion from deflection when the mounting portion is deflected.

13. The lens of claim 12, wherein the elongated recess is a first open-ended slot, the lens including a second open-ended slot adjacent the first open-ended slot, the first and second open-ended slots being disposed on opposite sides of the mounting portion.

14. The lens of claim 13, wherein an aspect ratio of the first open-ended slot is the same as an aspect ratio of the second open-ended slot.

15. The lens of claim 13, wherein the first and second open-ended slots are angled relative to one another.

16. Protective eyewear, comprising:
first and second temples; and
a lens coupled to the first and second temples, the lens including:
a viewing portion;
a mounting portion configured to be coupled to at least one of the first and second temples;
a connecting portion connecting the mounting portion to the viewing portion of the lens; and
an elongated slot having a length and a width, wherein the length is greater than the width, the elongated slot defining at least in part the mounting portion and the connecting portion, wherein the elongated slot is configured to effectively isolate the viewing portion from deflection of the mounting portion, wherein the mounting portion is on an opposite side of the width of the elongated slot from the viewing portion.

17. The protective eyewear of claim 16, further comprising a frame coupled to the first and second temples and coupled to the lens, wherein the first and second temples are coupled to the lens through the frame.

18. The protective eyewear of claim 16, wherein the first and second temples have respective attachment portions, each coupled directly to the lens.

19. The protective eyewear of claim 16, wherein the length and the width of the elongated slot have an aspect ratio of 4:1 or greater.

20. The protective eyewear of claim 16, wherein the elongated slot and connecting portion are configured to allow the mounting portion to be biased by the outward force without transferring the deflection forces to the viewing portion.

21. A method of forming a lens comprising:
shaping a lens to define a curvature or a contour of the lens; and
forming a recess between a mounting portion and a viewing portion of the lens, the recess including a length and a width with an aspect ratio of 4:1 or greater, the mounting portion opposite the width of the recess from the viewing portion.

22. The method of claim 21, wherein said forming the recess is performed during said shaping of the lens.

23. The method of claim 21, wherein said forming the recess includes cutting the recess in the lens after said shaping of the lens.

* * * * *